US009595871B1

(12) United States Patent
Bayer et al.

(10) Patent No.: US 9,595,871 B1
(45) Date of Patent: Mar. 14, 2017

(54) HIGH EFFICIENCY INDUCTIVE CAPACITIVE DC-DC CONVERTER

(71) Applicant: Texas Instruments Deutschland GmbH, Freising (DE)

(72) Inventors: Erich Johann Bayer, Thonhausen (DE); Michael Lueders, Munich (DE); Ruediger Rudolf Ganz, Freising (DE)

(73) Assignee: Texas Instruments Deutschland GmbH, Freising (DE)

( * ) Notice: Subject to any disclaimer, the term of this patent is extended or adjusted under 35 U.S.C. 154(b) by 0 days.

(21) Appl. No.: 14/976,334

(22) Filed: Dec. 21, 2015

(51) Int. Cl.
*G05F 1/00* (2006.01)
*H02M 3/158* (2006.01)
*H02M 3/155* (2006.01)
*G05F 1/24* (2006.01)

(52) U.S. Cl.
CPC ............ *H02M 3/1582* (2013.01); *G05F 1/24* (2013.01); *H02M 3/1584* (2013.01); *H02M 2003/1552* (2013.01)

(58) Field of Classification Search
CPC .......... H02P 6/14; H02P 6/00; H02M 3/1582; H02M 2003/1552; H02M 3/1584; G05F 1/10; G05F 1/24
USPC ........................................................ 323/271
See application file for complete search history.

(56) References Cited

U.S. PATENT DOCUMENTS

| | | | |
|---|---|---|---|
| 5,397,931 A | 3/1995 | Bayer | |
| 6,166,527 A * | 12/2000 | Dwelley | H02M 3/1582 323/222 |
| 6,226,193 B1 | 5/2001 | Bayer et al. | |
| 6,226,194 B1 | 5/2001 | Bayer et al. | |
| 6,320,456 B1 | 11/2001 | Bayer | |
| 6,359,797 B1 | 3/2002 | Bayer et al. | |
| 6,392,904 B1 | 5/2002 | Bayer et al. | |
| 6,483,282 B1 | 11/2002 | Bayer | |
| 6,788,033 B2 * | 9/2004 | Vinciarelli | H02M 3/1582 323/225 |

(Continued)

OTHER PUBLICATIONS

Dual-Output AMOLED Display Power Supply, TPS65631, Texas Instruments data sheet; SLVSBK1E, Sep. 2012, Revised May 2014; 25 pgs.

*Primary Examiner* — Timothy J Dole
*Assistant Examiner* — Lorena Bruner
(74) *Attorney, Agent, or Firm* — William B. Kempler; Charles A. Brill; Frank D. Cimino

(57) ABSTRACT

Disclosed examples include high-efficiency integrated circuits and inductive capacitive DC-DC converters with a first converter stage including first and second switches and an inductor, and a second converter stage including third and fourth switches and a flying capacitor. A dual mode control circuit regulates output voltage signal in a first mode when the output voltage signal is below a threshold by pulse width modulating the switches of the first converter stage. When the output voltage exceeds the threshold, the control circuit operates in a second mode with a first state to close the first and third switches, and a second state to close the fourth switch to connect the inductor in series with the flying capacitor. Dual mode operation of the first and second stages facilitates buck-boost operation with reduced inductor losses and converter switching losses, and the integrated circuit can be used in boost, buck or other configurations.

24 Claims, 7 Drawing Sheets

(56) References Cited

U.S. PATENT DOCUMENTS

| | | | |
|---|---|---|---|
| 7,157,888 B2 * | 1/2007 | Chen | H02M 3/157 |
| | | | 323/224 |
| 7,420,357 B2 | 9/2008 | Bayer | |
| 7,518,346 B2 | 4/2009 | Prexl et al. | |
| 7,545,658 B2 | 6/2009 | Thiele et al. | |
| 8,390,337 B2 | 3/2013 | Shumkov et al. | |
| 8,860,387 B2 * | 10/2014 | Kobayashi | H02M 3/1582 |
| | | | 323/259 |
| 9,024,593 B2 | 5/2015 | Keller et al. | |
| 9,178,424 B2 | 11/2015 | Schmeller et al. | |
| 2007/0210782 A1 | 9/2007 | Prexl et al. | |
| 2009/0174345 A1 | 7/2009 | Vaucourt et al. | |
| 2015/0256067 A1 | 9/2015 | Bayer et al. | |

* cited by examiner

HIGH EFFICIENCY INDUCTIVE CAPACITIVE DC-DC CONVERTER

TECHNICAL FIELD

The present disclosure relates to DC-DC converters and more particularly to high efficiency boost, buck and inverting buck-boost converter circuitry.

BACKGROUND

DC-DC converters convert input DC voltage to output DC voltage to drive a load. Buck type DC-DC converters include an inductor and one or more switches to provide output voltages up to the input voltage level. Boost converters also include an inductor and one or more switches to provide output voltages in excess of the input voltage. Buck-boost DC-DC converters can generate output voltages below or above the input voltage level.

FIG. 10 shows an inductive inverting buck-boost DC-DC converter 1000 with first and second (high side and low side) transistors M1 and M2 connected in series between an input voltage VIN and an output voltage VOUT. An inductor L is connected between a center switch node SW joining the transistors M1 and M2 and a ground connection. An input capacitor CIN is connected between VIN and ground, and an output capacitor COUT is connected between the output voltage VOUT and ground. In operation, the first transistor M1 is turned on while M2 is turned off in a first portion of a switching cycle for current flow along a first path 1001, and M2 is turned on while M1 is turned off in a second portion of a switching cycle for current flow along a second path 1002. During the first portion of each switching cycle, M1 is turned on which connects the switch node SW to the supply voltage VIN. The inductor voltage is therefore VIN which results in a rising inductor current. In the first switching cycle portion, moreover, the voltage across M2 is VIN+|VOUT|. During the second switching cycle portion, M2 is turned on and M1 is turned off to connect the switch node SW to the output voltage VOUT. In this condition, the voltage across the inductor L is −VOUT, resulting in a falling inductor current, and the voltage across M1 is VIN+|VOUT|. Switching operation of M1 and M2 in this fashion provides a negative output voltage VOUT with an absolute value that can be greater than, less than, or equal to the level of the input voltage VIN.

The transistors M1 and M2 in the inverting buck-boost converter 1000 in FIG. 10 are exposed to the sum of the magnitudes of input voltage VIN and output voltage VOUT. In addition, the transistors M1 and M2 of the converter 1000 must be sized to withstand at least VIN +|VOUT| in switching mode, the converter 1000 requires transistors with higher voltage ratings than with standard buck or boost converters. The most severe situation comes during switching when M1 and M2 operate in the saturation region and conduct the full inductor current while blocking a high source-drain voltage. Increasing the blocking voltage of the transistors M1 and M2 increases the device size and thus the switching losses are increased compared with conventional buck converters. In addition, the voltage swing on the switch node SW and thus the voltage across the inductor L is higher than the inductor voltage swings associated with a conventional buck converter or a conventional boost converter. Although buck-boost topologies offer a wider output voltage range for a fixed input voltage VIN, the buck-boost converter 1000 suffers from a larger ripple current and higher inductive switching losses compared with buck or boost converter architectures. As a result, the conventional buck-boost converter 1000 cannot achieve efficiencies possible with a buck converter or with a boost converter.

FIG. 11 shows a three level converter 1100 using two additional transistors M3 and M4 connected between M1 and M2, and a capacitor C connected to additional capacitor nodes CAP1 and CAP2 across M3 and M4 to reduce the effective transistor and inductor voltage. The steady state capacitor bias voltage is (|VO|+VI)/2 and is subtracted from the input voltage VIN during a first switching cycle portion with M1 and M4 turned on for conduction along a path 1101. During the second switching cycle portion with M2 and M3 turned on, the capacitor voltage is subtracted from the output voltage VOUT and the voltage across the switches M1-M4 is reduced compared with the buck-boost converter 1000 of FIG. 10. In addition, the switch node voltage is reduced, resulting in lower inductor current ripple and lower conduction losses. However, the converter circuit 1100 of FIG. 11 has many disadvantages. In each switching cycle portion, two of the four transistors are connected in series, and the total switching loss is significant even though the individual transistors M1-M4 are smaller than transistors used in the buck-boost converter 1000 of FIG. 10. In addition, the converter 1100 includes two extra transistors M3 and M4, and three nodes that must be switched during each switching cycle. Furthermore, the capacitor C is typically too large to be integrated on a single chip, and thus two additional pins are needed for access to the CAP1 and CAP2 nodes. Moreover, there is no inherent reset state for the capacitor bias voltage, and an extra control loop is needed to avoid capacitor voltage run-away conditions.

SUMMARY

Disclosed examples include high-efficiency integrated circuits and inductive capacitive DC-DC converters providing the extended output voltage range advantages of buck-boost converters. The converter in one example includes a first converter stage having first and second switches and an inductor, as well as a second converter stage including third and fourth switches and a capacitor. A dual mode control circuit regulates the output voltage signal in a first mode when the output voltage signal is below a threshold by pulse width modulating the switches of the first converter stage. When the output voltage exceeds the threshold, the control circuit operates in a second mode with a first state to turn the first and third switches on, and a second state to turn the fourth switch on to connect the inductor in series with the flying capacitor. Dual mode operation with the first and second stages facilitates buck-boost operation with reduced inductor losses and converter switching losses, while reducing the blocking voltage requirements of the converter switches.

DETAILED DESCRIPTION

Figure 1:
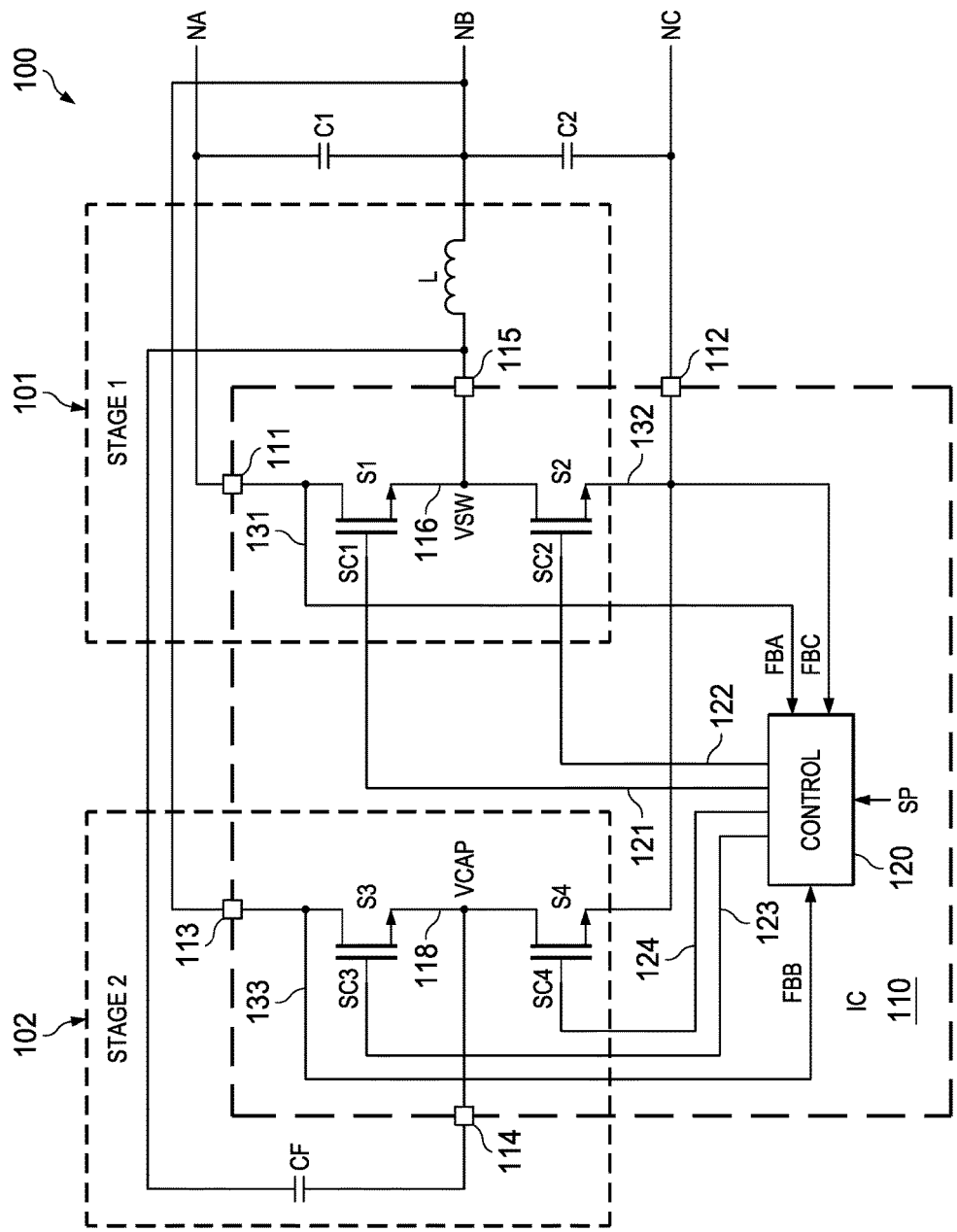
FIG. 1 is a schematic diagram of an integrated circuit in a high-efficiency DC-DC converter.

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to. . ." Also, the terms "couple" or "couples" and the phrase "coupled with" are intended to include indirect or direct electrical connection or combinations thereof. For example, if a first device couples to or is coupled with a second device, that connection may be through a direct electrical connection, or through an indirect electrical connection via one or more intervening devices and connections.

FIG. 1 shows a DC-DC converter system or circuit 100 that receives a DC input voltage signal and provides a DC output voltage signal to drive a load (not shown). As discussed further below, the converter circuit 100 can be operated in a variety of different configurations, including an inverting buck-boost configuration receiving an input voltage signal VI at a first I/O node NA relative to a second I/O node NB, and delivering an inverted or negative output voltage signal VO to a third I/O node NC relative to the node NB, as shown in FIGS. 2 and 4-7. In another possible configuration, the converter 100 operates as a boost converter receiving a DC input signal VI at the I/O node NB relative to a constant voltage at the node NA, and delivering an output voltage signal VO at the node NC, as further shown in FIG. 8 below. Another possible DC-DC converter configuration of the system 100 is a buck converter receiving the input voltage signal VI at node NC and delivering the output voltage signal VO at the node NB, both input and output voltages being relative to a constant voltage at node NA, as further shown in FIG. 9.

The DC-DC converter circuit 100 in one example is implemented using a DC-DC driver integrated circuit (IC) 110 as shown in FIG. 1, including a first pin 111 coupled with the I/O node NA, a second pin 112 coupled with the I/O node NC, a third pin 113 coupled with the I/O node NB, a fourth pin 114 and a fifth pin 115 for connection of an external flying capacitor CF. The pin 115 is connected to a switch node 116 of the IC 110, and an inductor L is coupled between the fifth pin 115 and the I/O node NB. In certain examples, the capacitor CF can be integrated within the IC 110. The example of FIG. 1 also includes a first capacitor C1 coupled between the I/O nodes NA and NB, as well as a second capacitor C2 coupled between NB and NC. The IC 110 also includes four switches S1, S2, S3 and S4. The switches S1-S4 can be any suitable type or types of semiconductor-based switches, including without limitation bipolar transistors, field effect transistors (FETs). The example of FIG. 1 includes N-channel FETs, although P-channel FETs and/or combinations of N and P-channel FETs can be used in various examples. Various components of the system 100 constitute first and second converter stages 101 and 102, respectively. The switches S1 and S2 and the inductor L form the first converter stage 101, and the switches S3 and S4 and the flying capacitor CF form the second converter stage 102. In certain embodiments, the inductor L is included in the integrated circuit 110.

The first switch S1 includes a first terminal coupled with a first node 131 in the IC 110, as well as a second terminal coupled with the switch node 116 and the fifth pin 115. A first terminal of the inductor L is coupled with the switch node 116, and the fifth pin 115. The first converter stage 101 also includes the second switch S2, which has a first terminal coupled with the switch node 116, and a second terminal coupled with a second internal node 132 and with the second pin 112. The third switch S3 includes a first terminal coupled with the third pin 113 and a third internal node 133 of the IC 110, and a second terminal coupled with a fourth internal node 118 coupled with the flying capacitor CF through the fourth pin 114. A first terminal of the capacitor CF is coupled with the fourth node 118 and the pin 114, and a second terminal of CF is coupled with the switch node 116 via the pin 115. The fourth switch S4 includes a first terminal coupled with the fourth node 118, and a second terminal coupled with the second node 132.

The IC 110 in FIG. 1 also includes a control circuit 120. The control circuit 120 can be any suitable analog and/or digital circuitry, and may include programmed logic and/or may be programmable. The control circuit 120 provides first, second, third, and fourth switching control signals SC1, SC2, SC3 and SC4 to gate control terminals of the switches S1, S2, S3 and S4 through corresponding connections 121, 122, 123 and 124, respectively. In the example of FIG. 1, for N-channel FETs S1-S4, the switching control signals SC1-SC4 are active high to turn on the corresponding switch, and a low signal state will turn off the corresponding switch. The control circuit 120 receives one or more feedback input signals, such as voltage signals in one example, including a first feedback signal FBA from the first node 131, a second feedback signal FBB from the third internal node 133, and a third feedback signal FBC from the second internal node 132. As seen in FIG. 1, this feedback arrangement provides first feedback signal FBA representing the voltage at the I/O node NA, the second feedback signal FBB representing the voltage at the I/O node NB, and the third feedback signal FBC representing the voltage at the third I/O node NC.

In disclosed examples, the control circuit 120 operates in first and second modes, referred to herein as a first operating mode OP-MODE-1 for a first output voltage range, and a second operating mode OP-MODE-2 for a second output voltage range. In addition, the control circuit example 120 implements closed loop feedback control to regulate an output voltage signal VO of the DC-DC converter circuit 100 according to a setpoint signal SP. The setpoint SP can be an internal signal in certain examples. In other examples, the setpoint SP is provided by a host circuit, for example, via another pin (not shown) of the IC 110. In certain applications, for example backlighting applications driving OLEDs or other similar loads (not shown), a host system provides the setpoint signal SP as a voltage input to the control circuit 120 of the IC 110 to set a brightness level of a driven load, such as a display screen backlight, etc.

Figure 2:
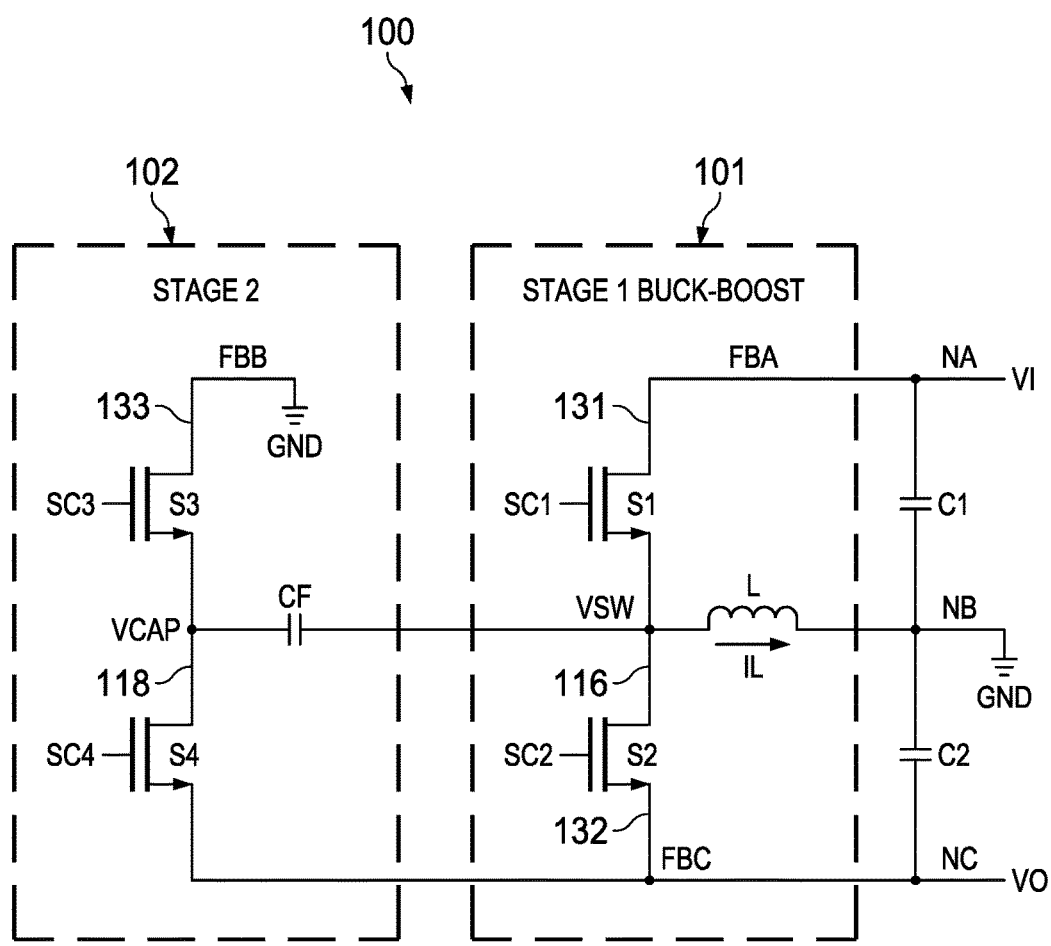
FIG. 2 is a schematic diagram of an inverting buck-boost DC-DC converter.

Referring also to FIGS. 2-7, operation of the DC-DC converter circuit 100 and the IC 110 are described in the context of a buck-boost implementation shown in FIG. 2. In this regard, FIGS. 2 and 4-9 illustrate the DC-DC converter circuit 100 without showing the control circuit 120, and omitting the pins and border of the IC 110 shown in FIG. 1 so as not to obscure the details of the illustrated examples. The example of FIGS. 2 and 3-7 is an inverting buck-boost DC-DC converter 100, in which the I/O node NA, and hence the first internal node 131 of the first converter stage 101 is connected to a supply voltage source (not shown) to receive a DC input voltage signal VI. In this example, moreover, the second I/O node NB is a constant voltage node connected to a circuit ground (GND), for connection with the node joining the capacitors C1 and C2 and the second terminal of the inductor L. Furthermore, the third I/O node NC of the DC-DC converter circuit 100 in this example is connected to deliver an output voltage signal VO to a load (not shown) via the second internal node 132. Also, the third internal node 133 is connected to the constant voltage connection GND at the I/O node NB.

As seen in FIG. 1, the pins 111-115 of the IC 110 allow connection of one or more external components, such as the inductor L, the flying capacitor CF, and one or both of the capacitors C1 and C2 with a supply voltage, a constant voltage node (e.g., circuit ground) and a load to form a DC-DC converter circuit 100. In this regard, the first pin 111 is electrically connected to the first node 131 to allow connection to a constant voltage node GND, or to receive the input voltage signal VI, and the second pin 112 is electrically connected to the second node 132 to allow connection to receive the input voltage signal VI or to provide the output voltage signal VO. The third pin 113 is electrically connected to the third node 133 to allow connection to an inductor L of the DC-DC converter 100. The fourth pin 114 is electrically connected to the fourth node 118 to allow connection to a capacitor CF of the DC-DC converter 100, and the fifth pin 115 is electrically connected to the switch node 116 to provide a switching signal to the inductor L and to the capacitor CF of the DC-DC converter 100.

In general, the control circuit 120 receives first and second feedback signals VO and VI from two of the first, second and third nodes 131, 132, 133. In FIG. 2, for example, the output and input feedback signals FBA and FBC are provided to the control circuit 120 along with feedback representing the ground reference via the feedback signal FBB. In the boost configuration of FIG. 8, FBB provides the input voltage feedback, FBC provides the output voltage feedback, and the ground reference is provided to the control circuit 120 by the FBA feedback signal. In the buck converter example of FIG. 9, the input voltage feedback is provided by the signal FBC, the output voltage feedback is provided by the signal FBB, and the ground reference is connected to the control circuit 120 by the FBA signal. The control circuit 120 compares the absolute value of the output voltage |VO| with a threshold voltage VTH and automatically switches between operating modes accordingly. In the buck-boost example of FIGS. 2-7, the threshold voltage is the input voltage VI. In the other example configurations of the circuit 100 shown in FIGS. 8 and 9, the threshold voltage signal level VTH is different from the input voltage level VI. The control circuit 120 in some examples automatically switches between the first and second operating modes OP-MODE-1, OP-MODE-2 according to the feedback signals representing VO and VI.

Returning to the buck-boost example of FIG. 2, the control circuit 120 compares an absolute value of the FBC output voltage signal with the input voltage signal via FBA to determine whether the output voltage amplitude (|VO|) exceeds the input voltage signal VI. In this case, the input voltage signal level serves as a threshold voltage VTH. The control circuit 120 in one example includes one or more comparator circuits and signal conditioning amplifiers (not shown) by which the absolute voltage of the output voltage signal VO is compared with the input voltage signal VI. The result of this comparison in one example is a comparator output signal having one of two states indicating the relative amplitudes of |VO| and VI. In some examples, the control circuit 120 uses the feedback information from two or all of the feedback signals FBA, FBB and FBC and automatically sets the operating mode, and one or more of the signals is also used for closed loop feedback control to regulate the output voltage VO provided by the DC-DC converter circuit 100 to drive a load.

The control circuit 120 operates in the first mode OP-MODE-1 when |VO| is less than VTH (e.g., less than VI) to turn off the switches S3 and S4 of the second converter stage 102, and provides pulse width modulated switching control signals SC1 and SC2 on lines 121 and 122 to the switches S1 and S2 in alternating fashion to regulate the output voltage signal VO according to a setpoint signal SP. In the second mode OP-MODE-2 when |VO| is greater than the threshold VTH (e.g., greater than VI) the control circuit 120 turns off the second switch S2 (e.g., sets SC2 low) and provides pulse width modulated switching control signals SC1, SC3 and SC4 to switches S1, S3 and S4 to regulate VO according to the setpoint signal SP. In the illustrated example, moreover, the control circuit 120 operates in the second mode OP-MODE-2 to provide the switching control signals to S1, S3 and S4 in alternating first and second states. In the first state of the second mode OP-MODE-2, the control circuit 120 turns off S2 and S4, and turns on S1 and S3 to charge the capacitor CF. In the second state of the second mode OP-MODE-2, the control circuit 120 turns off S1-S3 and turns S4 on in order to couple CF in series with the inductor L between GND and VO.

Figure 3:
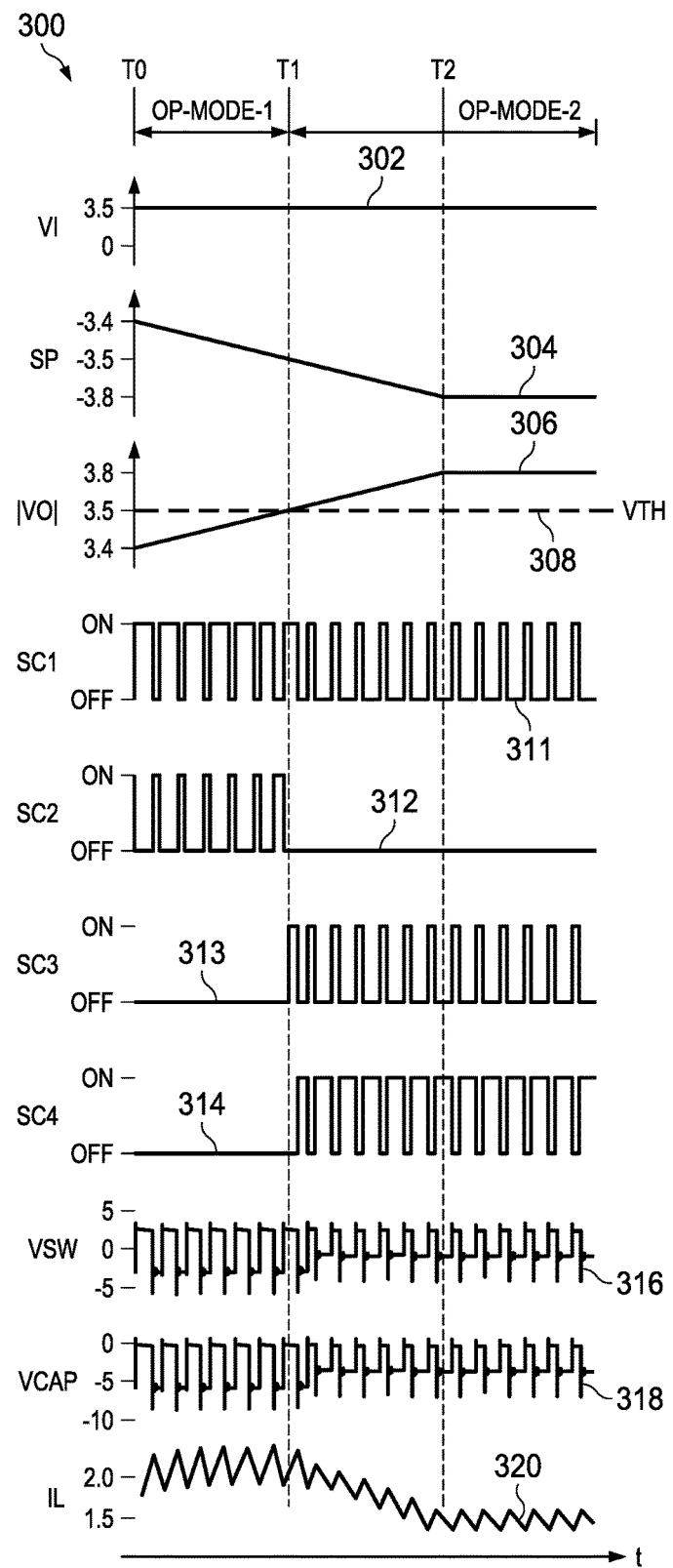
FIG. 3 is a signal diagram of waveforms and switching control signals in the DC-DC converter of FIG. 2.
Figure 4:
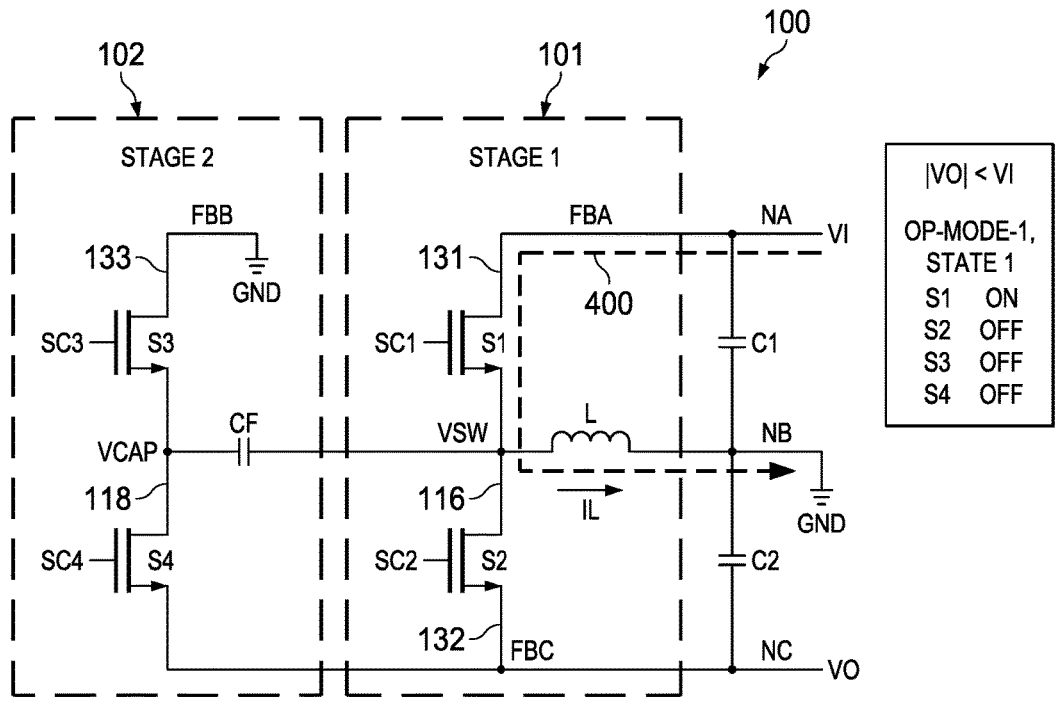
FIG. 4 is a schematic diagram of operation of the converter of FIG. 2 in a first switching state of a first operating mode for input voltages exceeding the absolute value of the output voltage.
Figure 5:
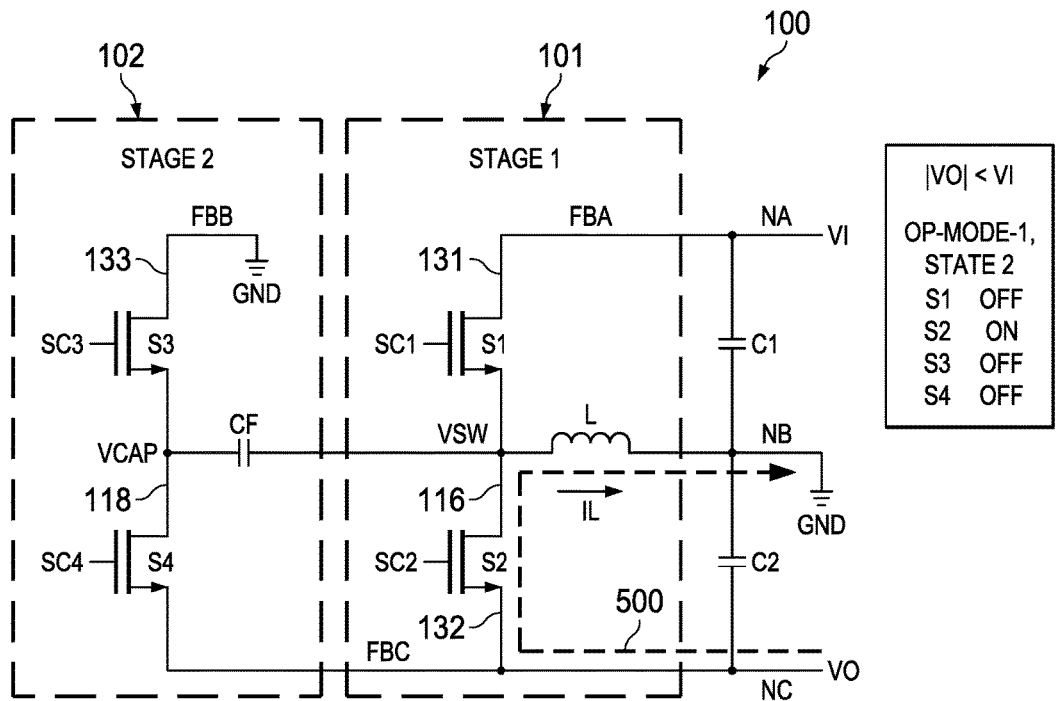
FIG. 5 is a schematic diagram of operation of the converter of FIG. 2 in a second switching state of the first operating mode.
Figure 6:
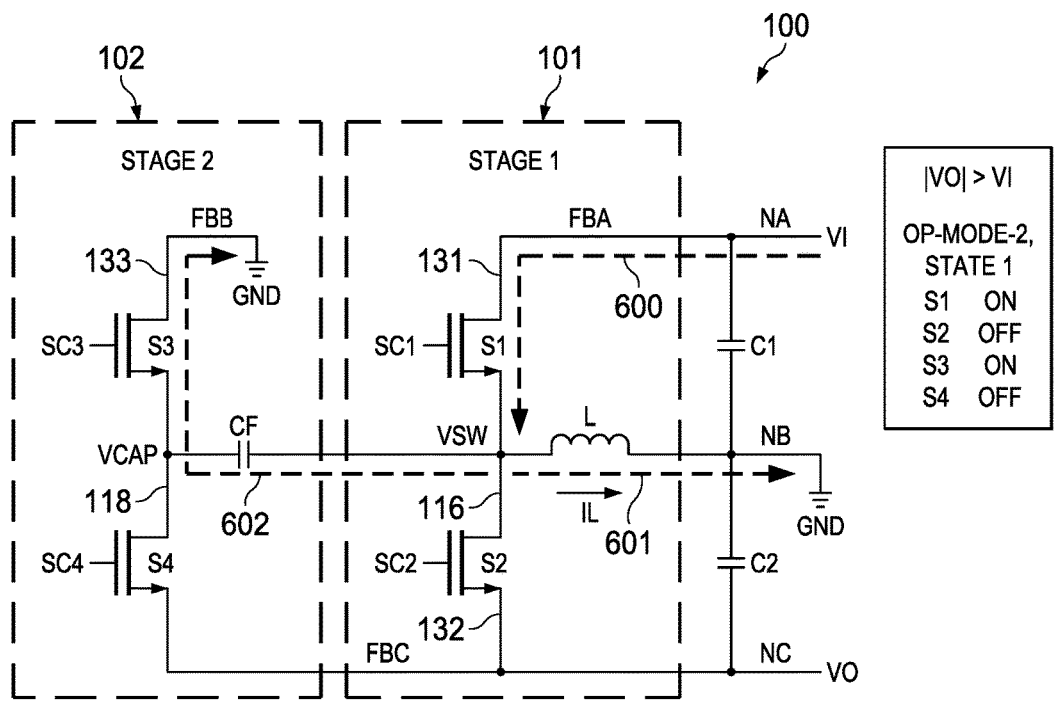
FIG. 6 is a schematic diagram of operation of the converter of FIG. 2 in a first switching state of a second operating mode for input voltages below the absolute value of the output voltage.
Figure 7:
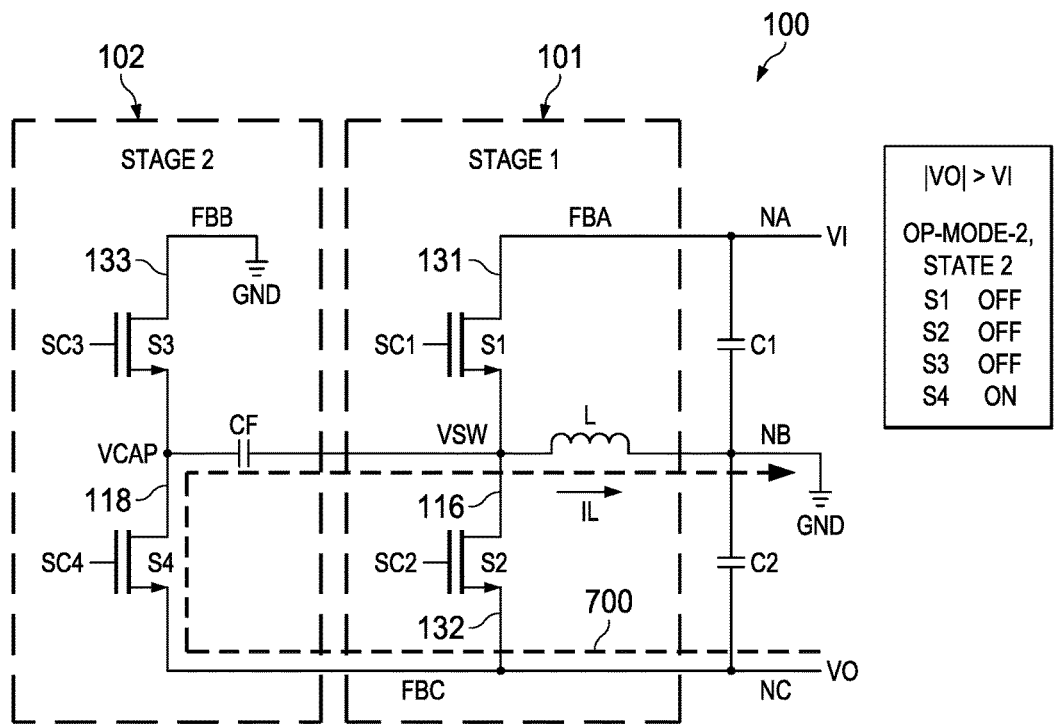
FIG. 7 is a schematic diagram of operation of the converter of FIG. 2 in a second switching state of the second operating mode.
Figure 10:
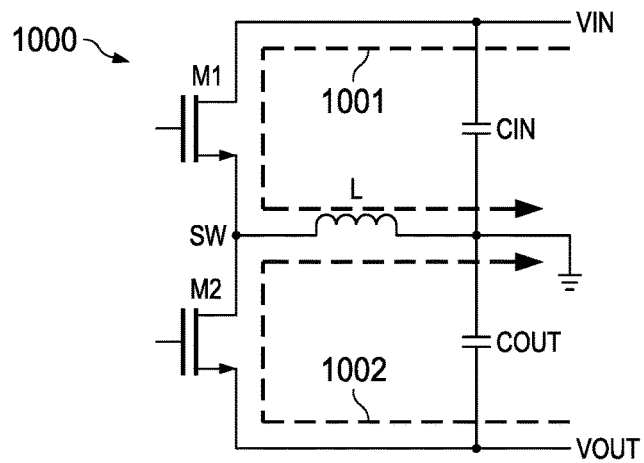
FIG. 10 is a schematic diagram of an inverting buck-boost converter.
Figure 11:
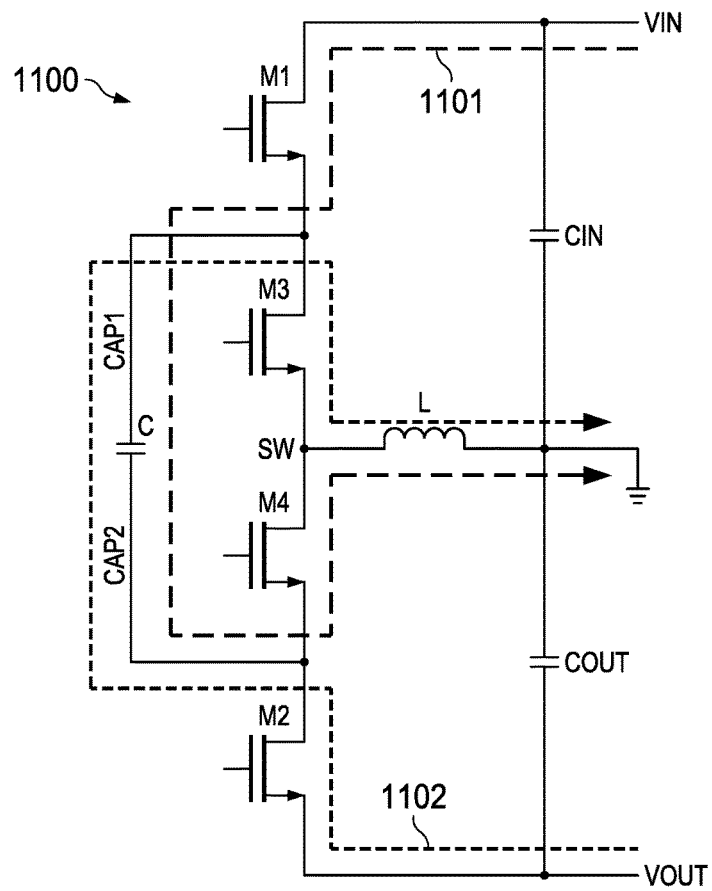
FIG. 11 is a schematic diagram of a three-level inverting buck-boost converter.

The dual mode operation of the control circuit 120 advantageously operates the first stage 101 as an inverting buck-boost converter for low output voltages below VTH in the first mode OP-MODE-1 during which the blocking voltage requirements of S1 and S2 do not exceed VI. Consequently, the switches S1 and S2 can be sized for this lower voltage operation, and do not suffer from excessive switching or conduction loss, as was the case with the converter 1000 of FIG. 10. Moreover, the voltage across the inductor L in the first mode OP-MODE-1 does not exceed VI, and thus the inductor ripple and hysteresis loss is low. To implement the second mode OP-MODE-2, the IC 110 includes two additional switches S3 and S4 as part of the second converter stage 102. However, the switching in the second mode OP-MODE-2 is much different from the 4-switch converter topology 1100 in FIG. 11. In the second mode, the control circuit 120 turns S2 off and the second converter stage 102 operates with S1 and the inductor L to form an inductive driven capacitive DC-DC charge pump converter. FIG. 3 shows example switching control signals and circuit signal waveforms in the inductive capacitive inverting buck-boost configuration of FIG. 2. FIGS. 4 and 5 illustrate operation in the first mode OP-MODE-1 and FIGS. 6 and 7 illustrate operation in the second mode OP-MODE-2.

Referring to FIGS. 3-5, for output voltages |VO| below VI, the control circuit 120 operates the first stage 101 as an inverting buck-boost converter. The first mode operation is shown from T0 through T1 in the graph 300 of FIG. 3. In this illustrated example, the input voltage VI is shown as curve 302 which is a constant (e.g., 3.5 V). The circuit 100 operates according to a setpoint signal SP (curve 304) initially at −3.4 V and decreasing to −3.8 V at time T2. Using closed loop feedback and pulse width modulation control, the control circuit 120 regulates the output voltage such that the absolute value |VO| is shown as curve 306 in FIG. 3. In this example, moreover, the input voltage level VI is used as the threshold voltage value VTH (e.g., 3.5 V), shown as curve 308. Thus, when the output voltage curve 306 crosses the threshold curve 308 at T1, the control circuit 120 transitions from the first mode OP-MODE-1 to the second mode OP-MODE-2. In this example, the setpoint value SP curve 304 remains generally constant at −3.8 V after T2. In practice, the setpoint SP curve 304 can vary according to any host system setpoint signal received by the control circuit 120. Also, the input voltage VI curve 302 may change in certain applications. The control circuit 120 in this example uses the present input voltage value VI curve 302 as the voltage threshold VTH curve 308 and accommodates any changing conditions of the input voltage VI and/or the setpoint SP. The graph 300 and FIG. 3 also shows the switching control signals SC1 (curve 311), SC2 (curve 312), SC3 (curve 313), SC4 (curve 314) that are generated by the control circuit 120 during the first and second operating modes. The switching control signals SC1-SC4 shown in FIG. 3 in the first and second modes are also provided by the control circuit 124 the other DC-DC converter configurations shown in FIGS. 8 and 9 below.

In the example of FIGS. 2-7, the control circuit 120 generates the switching control signals shown in curves 311-314 according to the first feedback signal FBA (VI) and the third feedback signal FBC (VO) in order to regulate the output voltage VO according to the setpoint signal SP curve 304. FIG. 3 also shows the voltage VSW (curve 316) at the switch node 116 in FIGS. 2 and 4-7, which represents the voltage at the fifth pin 115 at the first terminal of the inductor L. Curve 318 in FIG. 3 further illustrates the voltage VCAP at the fourth node 118 of FIGS. 2 and 4-7, representing the voltage of the capacitor CF. Curve 320 in FIG. 3 illustrates the inductor current IL flowing from left to right through the inductor L of the first converter stage 101 of FIGS. 2 and 4-7. As further shown in FIG. 3, the control circuit 120 automatically switches between the first and second modes OP-MODE-1 and OP-MODE-2 according to the output voltage signal VO and the input voltage signal VI.

The first operating mode OP-MODE-1 from T0 through T1 is described with respect to FIGS. 3-5. In this mode, the control circuit 120 turns off S3 and S4 to deactivate the second converter stage 102, and pulse width modulates the first and second switches S1 and S2 of the first converter stage 101 in alternating fashion to control the output voltage signal VO according to the setpoint signal SP. The first converter stage 101 is operated in this mode as an inverting buck-boost converter with the first node 131 receiving the input voltage signal VI, the second node 132 delivering the output voltage signal VO to drive a load, and the third node 133 coupled to GND at the second terminal of the inductor L. The control circuit 120 provides the pulse width modulated switching control signals SC1 and SC2 in the first mode OP-MODE-1 in first and second portions or phases of a series of switching cycles, with the pulse widths determined according to the closed loop feedback control of the output voltage signal VO.

As shown in FIG. 4, during the ON-Phase, the high side switch S1 is turned on while S2 is turned off to connect the switch node 116 to the input voltage signal VI. This results in a current flow path indicated as 400 and FIG. 4. The inductor voltage in this condition is VI, resulting in a rising inductor current shown as a rising portion of the curve 320 in FIG. 3. During the OFF-Phase of FIG. 5, S1 is turned off and the low side rectifier S2 is turned on to connect the switch node 116 to the output voltage VO. This provides a current flow path 500 as shown in FIG. 5. In this state, the voltage across the inductor L is −VO, causing a falling inductor current IL. Operation in the first mode OP-MODE-1 continues in a series of switching cycles, each including alternating actuations of S1 and S2 by the control circuit 120 in closed loop fashion to regulate the output voltage signal VO.

It is noted that the voltage rating for S1 and S2 is VI+|VO| in this case. However, since VO is not at the maximum level in the first operating mode OP-MODE-1, S1 and S2 can advantageously be sized for a lower switched mode maximum blocking voltage rating than with a standard approach in FIG. 10. This, in turn, reduces the switching losses and the DC-DC converter system 100 compared with the converter 1000 of FIG. 10. Moreover, unlike the converter 1100 of FIG. 11, the operation of the DC-DC converter circuit 100 and FIGS. 2 and 4-7 only connects a total of two transistors in the current path (instead of four), but the transistors in the circuit 100 individually have a lower voltage rating, by which the total conduction losses are reduced compared to the solution of FIG. 11.

The second operating mode OP-MODE-2 is now described with reference to FIGS. 3, 6 and 7. For large output voltage magnitudes VO exceeding the input voltage signal VI (e.g., after T1 in FIG. 3), the control circuit 120 enters the OP-MODE-2 mode. In this mode, the control circuit 120 operates the converter circuit 100 as an inductive driven inverting charge pump converter. As seen in FIG. 3, the control circuit 120 turns off S2, and provides pulse width modulated switching control signals SC1, SC3 and SC4 to the switches S1, S3 and S4 to regulate the output voltage signal VO in the second mode OP-MODE-2. In each switching cycle in this mode, the control circuit 120 implements first and second states, respectively shown in FIGS. 6 and 7. In the first state of the second mode OP-MODE-2, the control circuit 120 turns on the high side switch S1 of the first converter stage 101 along with the switch S3 of the second converter stage 102. This connects the switch node 116 to the input voltage signal VI, and the inductor voltage in this condition is VI, leading to a rising inductor current shown in curve 320 of FIG. 3. As shown in FIG. 6 for this state of the second mode, current flows from the input along path 600, and flows along path 601 through the inductor L to GND. Also, turning on S3 connects the capacitor node 118 to ground, causing current flow along the path 602 which charges CF to VI.

FIG. 7 shows the second state or OFF-Phase in the second mode OP-MODE-2. The control circuit 120 turns S4 on and turns off S1-S3 to coupled CF in series with the inductor L between the output and GND for current flow along a path 700. Because CF is charged to VI in the first state of OP-MODE-2, the voltage level on the switch node 116 is now at —VO+VI as seen in the curves 318 and 320 in FIG. 3. In this manner, the amplitude on the inductive switch node 116 is reduced to |VO| instead of VI+|VO| as was the case in the converter 1000 of FIG. 10. Consequently, the converter 100 of FIGS. 2 and 4-7 has reduced ripple current and lower inductive losses compared with the converter 1000 in FIG. 10. In the second operating mode OP-MODE-2, three transistors (S1, S3 and S4) are active, but only one (S1 or S4) is in the output conduction path, and thus the transistor switching and conduction losses are lower than the converter 1100 of FIG. 11. Moreover, CF performs a voltage blocking function and the switches S1, S3 and S4 are therefore only exposed to a maximum switching voltage of |VO|. S2 is exposed to VI+|VO|, but only in the non-switching mode when the gate source voltage VGS of S2 is zero. Since a Power MOS-FET can tolerate higher voltages in off-mode (VGS=0) than in on-mode (VGS>VT), the switches S1-S4 can all be MOS-FETs with lower switched mode breakdown ratings, including S2. In addition, the capacitor CF is recharged to VI in each switching cycle in OP-MODE-2, so there is no problem with capacitor bias voltage runaway as was the case for the converter 1100 in FIG. 11. In addition, the control circuit 120 of the IC 110 automatically switches between the modes OP-MODE-1 and OP-MODE-2 according to the output voltage signal VO and the input voltage signal VI of the DC-DC converter 100.

Referring also to FIGS. 1, 3, 8 and 9, the DC-DC converter circuit 100 can be configured to achieve these same advantages in other converter topologies, including boost converters (FIG. 8) and buck converters (FIG. 9) by connecting VI, GND and VO to different nodes of the circuit 100. The IC 110 is thus adaptable to a wide variety of DC-DC converter applications. Moreover, these configurations also achieve the above advantages with respect to reduced switch voltage ratings and reduced inductor ripple current. As such, the IC 110 and the disclosed example DC-DC converters provide better circuit efficiency for backlight or display driver applications or other end-use situations, particularly compared with the conventional buck-boost circuit 1000 of FIG. 10.

Figure 8:
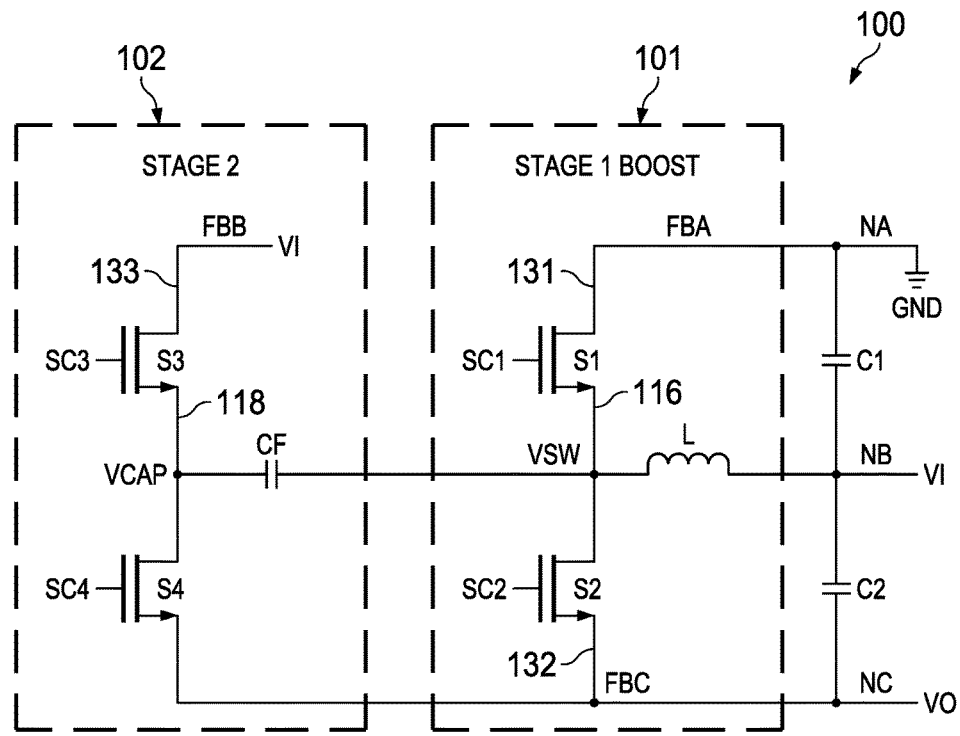
FIG. 8 is a schematic diagram of a boost DC-DC converter.
Figure 9:
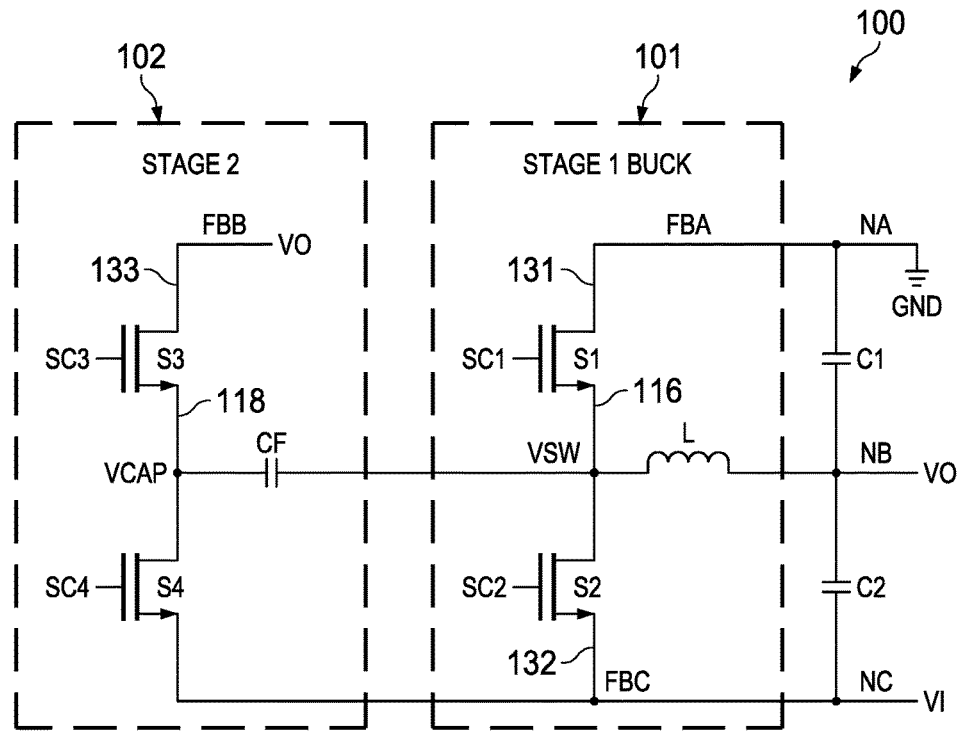
FIG. 9 is a schematic diagram of a buck DC-DC converter.

In FIG. 8, the converter 100 operates the first converter stage 101 as a boost converter, with the control circuit 120 providing the switching control signals SC1-SC4 as described above in connection with FIG. 3 in first and second operating modes OP-MODE-1 and OP-MODE-2 based on comparison of the absolute value of the output voltage VO with a threshold voltage VTH. In the case of a boost converter in FIG. 8, the threshold voltage VTH is twice the input voltage VI. In the example of FIG. 8, the first node 131 is coupled to GND, the second node 132 is coupled to deliver the output voltage signal VO, the third node 133 receives the input voltage signal VI, and the second terminal of the inductor L is coupled to the third node 133. In the buck converter example of FIG. 9, the threshold voltage VTH is one half the input voltage VI, and the first node 131 is coupled with GND. The second node 132 receives the input voltage signal VI, the third node 133 delivers the output voltage signal VO, and the second terminal of the inductor L is coupled to the third node 133.

The above examples are merely illustrative of several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims.

The following is claimed:

1. A DC-DC converter circuit to provide a DC output voltage signal, comprising:
a first converter stage, including:
a first switch including a first terminal coupled with a first node, and a second terminal coupled with a switch node,
an inductor including a first terminal coupled with the switch node, and a second terminal, and
a second switch including a first terminal coupled with the switch node, and a second terminal coupled with a second node;
a second converter stage, including:
a third switch including a first terminal coupled with a third node, and a second terminal coupled with a fourth node,
a capacitor including a first terminal coupled with the fourth node, and a second terminal coupled with the switch node, and
a fourth switch including a first terminal coupled with the fourth node, and a second terminal coupled with the second node; and
a control circuit operative in a first mode when an absolute value of the output voltage signal is less than a threshold to turn off the third and fourth switches of the second converter stage, and to provide pulse width modulated switching control signals to the first and second switches of the first converter stage in alternating fashion to regulate the output voltage signal according to a setpoint signal;
the control circuit operative in a second mode when the absolute value of the output voltage signal is greater than the threshold to turn off the second switch, and to provide pulse width modulated switching control signals to the first, third and fourth switches to regulate the output voltage signal according to the setpoint signal.

2. The DC-DC converter circuit of claim 1,
wherein the control circuit is operative in the second mode to provide pulse width modulated switching control signals to the first, third and fourth switches in alternating first and second states;
wherein in the first state of the second mode, the control circuit turns off the second and fourth switches and turns on the first and third switches to charge the capacitor; and
wherein in the second state of the second mode, the control circuit turns off the first, second and third switches and turns on the fourth switch to couple the capacitor and the inductor in series with one another between a constant voltage node and an output node.

3. The DC-DC converter circuit of claim 2, wherein the first converter stage is operative as an inverting buck-boost converter, the first node being coupled to receive an input voltage signal, the second node being coupled to deliver the output voltage signal, the third node being coupled to the constant voltage node, and the second terminal of the inductor being coupled to the third node.

4. The DC-DC converter circuit of claim 3, wherein the threshold is the input voltage signal; wherein the control circuit operative in the first mode when the absolute value of the output voltage signal is less than the input voltage signal; wherein the control circuit operative in the second mode when the absolute value of the output voltage signal is greater than the input voltage signal; and wherein the control circuit is operative to automatically switch between the first and second modes according to the output voltage signal and the input voltage signal.

5. The DC-DC converter circuit of claim 2, wherein the first converter stage is operative as a boost converter, the first node being coupled to the constant voltage node, the second node being coupled to deliver the output voltage signal, the third node being coupled to receive the input voltage signal, and the second terminal of the inductor being coupled to the third node.

6. The DC-DC converter circuit of claim 2, wherein the first converter stage is operative as a buck converter, the first node being coupled to the constant voltage node, the second node being coupled to receive the input voltage signal, the third node being coupled to deliver the output voltage signal, and the second terminal of the inductor being coupled to the third node.

7. The DC-DC converter circuit of claim 2, wherein the control circuit is operative to compare the output voltage signal with the input voltage signal, and to automatically switch between the first and second modes according to the output voltage signal and the input voltage signal.

8. The DC-DC converter circuit of claim 1, wherein the first converter stage is operative as an inverting buck-boost converter, the first node being coupled to receive an input voltage signal, the second node being coupled to deliver the output voltage signal, the third node being coupled to the constant voltage node, and the second terminal of the inductor being coupled to the third node.

9. The DC-DC converter circuit of claim 8, wherein the threshold is the input voltage signal; wherein the control circuit operative in the first mode when the absolute value of the output voltage signal is less than the input voltage signal; wherein the control circuit operative in the second mode when the absolute value of the output voltage signal is greater than the input voltage signal; and wherein the control circuit is operative to automatically switch between the first and second modes according to the output voltage signal and the input voltage signal.

10. The DC-DC converter circuit of claim 1, wherein the first converter stage is operative as a boost converter, the first node being coupled to the constant voltage node, the second node being coupled to deliver the output voltage signal, the third node being coupled to receive an input voltage signal, and the second terminal of the inductor being coupled to the third node.

11. The DC-DC converter circuit of claim 1, wherein the first converter stage is operative as a buck converter, the first node being coupled to the constant voltage node, the second node being coupled to receive an input voltage signal, the third node being coupled to deliver the output voltage signal, and the second terminal of the inductor being coupled to the third node.

12. The DC-DC converter circuit of claim 1, wherein the control circuit is operative to compare the output voltage signal with an input voltage signal, and to automatically switch between the first and second modes according to the output voltage signal and the input voltage signal.

13. The DC-DC converter circuit of claim 1, comprising a first capacitor coupled between the first node and the second terminal of the inductor, and a second capacitor coupled between the second node and the second terminal of the inductor.

14. An integrated circuit (IC) for controlling an output voltage signal of a DC-DC converter, comprising:
a first switch including a first terminal coupled with a first node, and a second terminal coupled with a switch node;
a second switch including a first terminal coupled with the switch node, and a second terminal coupled with a second node;
a third switch including a first terminal coupled with a third node, and a second terminal coupled with a fourth node;
a fourth switch including a first terminal coupled with the fourth node, and a second terminal coupled with the second node; and a control circuit operative in a first mode to turn off the third and fourth switches, and to provide pulse width modulated switching control signals to the first and second switches in alternating fashion to regulate the output voltage signal according to a setpoint signal;
the control circuit operative in a second mode to turn off the second switch, and to provide pulse width modulated switching control signals to the first, third and fourth switches to regulate the output voltage signal according to the setpoint signal.

15. The IC of claim 14,
wherein the control circuit is operative in the second mode to provide pulse width modulated switching control signals to the first, third and fourth switches in alternating first and second states;
wherein in the first state of the second mode, the control circuit turns off the second and fourth switches and turns on the first and third switches; and
wherein in the second state of the second mode, the control circuit turns off the first, second and third switches and turns on the fourth switch.

16. The IC of claim 15, comprising:
a first pin electrically connected to the first node to allow connection to a constant voltage node, or to receive the input voltage signal;
a second pin electrically connected to the second node to allow connection to receive the input voltage signal or to provide the output voltage signal;
a third pin electrically connected to the third node to allow connection to an inductor of the DC-DC converter;
a fourth pin electrically connected to the fourth node to allow connection to a capacitor of the DC-DC converter; and
a fifth pin electrically connected to the switch node to provide a switching signal to the inductor and to the capacitor of the DC-DC converter.

17. The IC of claim 16, wherein the control circuit is operative in the second state of the second mode to turn off the first, second and third switches and turn on the fourth switch to couple the capacitor and the inductor in series with one another between a constant voltage node and an output node.

18. The IC of claim 14, wherein the control circuit is operative to automatically switch between the first and second modes according to an output voltage signal of the DC-DC converter and an input voltage signal of the DC-DC converter.

19. The IC of claim 14, comprising:
a first pin electrically connected to the first node to allow connection to a constant voltage node, or to receive the input voltage signal;
a second pin electrically connected to the second node to allow connection to receive the input voltage signal or to provide the output voltage signal;
a third pin electrically connected to the third node to allow connection to an inductor of the DC-DC converter;
a fourth pin electrically connected to the fourth node to allow connection to a capacitor of the DC-DC converter; and
a fifth pin electrically connected to the switch node to provide a switching signal to the inductor and to the capacitor of the DC-DC converter.

20. An integrated circuit (IC) for controlling a DC-DC converter, comprising:
a first switch coupled between a first node and a switch node;

a second switch coupled between the switch node and a second node;

a third switch coupled between a third node and a fourth node;

a fourth switch coupled between the fourth node and the second node; and a control circuit operative to receive first and second feedback signals from two of the first, second and third nodes, the control circuit operative in a first mode to turn off the third and fourth switches, and to provide pulse width modulated switching control signals to the first and second switches in alternating fashion to regulate the output voltage signal according to a setpoint signal;

the control circuit operative in a second mode to turn off the second switch, and to provide pulse width modulated switching control signals to the first, third and fourth switches to regulate the output voltage signal according to the setpoint signal; and the control circuit operative to automatically switch between the first and second modes according to the first and second feedback signals.

21. The IC of claim 20, wherein the control circuit is operative in the second mode to provide pulse width modulated switching control signals to the first, third and fourth switches in alternating first and second states;

wherein in the first state of the second mode, the control circuit turns off the second and fourth switches and turns on the first and third switches; and wherein in the second state of the second mode, the control circuit turns off the first, second and third switches and turns on the fourth switch.

22. The IC of claim 21, comprising:

a first pin electrically connected to the first node to allow connection to a constant voltage node, or to receive the input voltage signal;

a second pin electrically connected to the second node to allow connection to receive the input voltage signal or to provide the output voltage signal;

a third pin electrically connected to the third node to allow connection to an inductor of the DC-DC converter;

a fourth pin electrically connected to the fourth node to allow connection to a capacitor of the DC-DC converter; and a fifth pin electrically connected to the switch node to provide a switching signal to the inductor and to the capacitor of the DC-DC converter.

23. The IC of claim 22, wherein the control circuit is operative in the second state of the second mode to turn off the first, second and third switches and turn on the fourth switch to couple the capacitor and the inductor in series with one another between a constant voltage node and an output node.

24. The IC of claim 20, wherein the control circuit is operative to automatically switch between the first and second modes according to an output voltage signal of the DC-DC converter and an input voltage signal of the DC-DC converter.

* * * * *